US012401951B2

(12) United States Patent
Rusconi Clerici Beltrami et al.

(10) Patent No.: US 12,401,951 B2
(45) Date of Patent: Aug. 26, 2025

(54) MEMS SOUND TRANSDUCER WITH A CURVED CONTOUR OF A CANTILEVER ARM ELEMENT

(71) Applicant: USound GmbH, Graz (AT)

(72) Inventors: Andrea Rusconi Clerici Beltrami, Vienna (AT); Ferruccio Bottoni, Graz (AT); Samu Horvath, Vienna (AT); Christian Novotny, Vienna (AT)

(73) Assignee: USound GmbH, Graz (AT)

( * ) Notice: Subject to any disclaimer, the term of this patent is extended or adjusted under 35 U.S.C. 154(b) by 344 days.

(21) Appl. No.: 17/987,036

(22) Filed: Nov. 15, 2022

(65) Prior Publication Data

US 2023/0188903 A1 Jun. 15, 2023

(30) Foreign Application Priority Data

Nov. 17, 2021 (DE) ..................... 10 2021 130 035.5

(51) Int. Cl.
*H04R 17/00* (2006.01)
*H04R 19/00* (2006.01)

(52) U.S. Cl.
CPC ..... *H04R 19/005* (2013.01); *H04R 2201/003* (2013.01)

(58) Field of Classification Search
CPC ....................... H04R 19/005; H04R 2201/003; H04R 19/04; H04R 31/00; H04R 17/00; B81B 3/00; B81B 2201/0257; H10N 30/30; H10N 30/80
See application file for complete search history.

(56) References Cited

U.S. PATENT DOCUMENTS

| | | | | |
|---|---|---|---|---|
| 9,936,298 B2 | 4/2018 | Buck et al. | | |
| 10,825,982 B1 * | 11/2020 | Littrell | .................. | H04R 17/02 |
| 2011/0051985 A1 * | 3/2011 | Hwang | .................. | H04R 17/00 381/396 |

(Continued)

FOREIGN PATENT DOCUMENTS

| | | | | |
|---|---|---|---|---|
| DE | 102017208911 A1 * | 11/2018 | ............. | H04R 17/00 |
| EP | 2362686 A2 * | 8/2011 | ............. | H04R 17/00 |

(Continued)

OTHER PUBLICATIONS

The German Search Report with English translation for application No. DE102021130035.5, 12 pages.

(Continued)

*Primary Examiner* — Vivian C Chin
*Assistant Examiner* — Annabelle Kang
(74) *Attorney, Agent, or Firm* — Dority & Manning, P.A.

(57) ABSTRACT

A MEMS sound transducer for generating and/or detecting sound waves includes a support having a cavity wall which at least partially delimits a cavity of the MEMS sound transducer. At least one cantilever arm element includes a base section that is fixedly connected to the support. Each cantilever arm includes a flexible deflection section overhanging the cavity wall. At one end of the deflection portion is a base end that is disposed to face the cavity wall. Opposite the base end is a free end that is configured to be deflectable relative to the support in the direction of a stroke axis of the MEMS sound transducer. The base end of the deflection section in a sound transducer top view has a curved first contour.

14 Claims, 3 Drawing Sheets

(56) References Cited

U.S. PATENT DOCUMENTS

| | | | | |
|---|---|---|---|---|
| 2012/0250909 | A1 | 10/2012 | Grosh et al. | |
| 2012/0270352 | A1 * | 10/2012 | Huffman | H02N 1/002 257/E21.002 |
| 2019/0281393 | A1 | 9/2019 | Grosh et al. | |
| 2020/0238981 | A1 | 7/2020 | Seo | |
| 2021/0067853 | A1 * | 3/2021 | Bottoni | H04R 17/02 |
| 2021/0092509 | A1 * | 3/2021 | Rusconi Clerici Beltrami | H04R 31/00 |
| 2023/0188896 | A1 * | 6/2023 | Barsukou | H04R 7/06 381/91 |

FOREIGN PATENT DOCUMENTS

| | | | | |
|---|---|---|---|---|
| JP | 2021052305 | A * | 4/2021 | B81B 3/0021 |
| JP | 2021102640 | A | 7/2021 | |
| WO | WO2013/002847 | A1 | 1/2013 | |
| WO | WO2016/048936 | A1 | 3/2016 | |

OTHER PUBLICATIONS

The Extended Search Report with English translation for application No. 22207935.2, Apr. 18, 2023, 11 pages.

Extended European Search Report for EP Application No. 24197146.4, dated Nov. 15, 2024, 6 pages.

* cited by examiner

MEMS SOUND TRANSDUCER WITH A CURVED CONTOUR OF A CANTILEVER ARM ELEMENT

FIELD OF THE INVENTION

The present invention relates to a MEMS sound transducer for generating and/or detecting sound waves, including a support having a cavity wall, which at least partially delimits a cavity of the MEMS sound transducer, and at least one cantilever arm element having a base section fixedly connected to the support and a flexible deflection section projecting beyond the cavity wall, the deflection section having a base end facing the cavity wall and a free end deflectable relative to the support in the direction of a reciprocation axis of the MEMS sound transducer.

BACKGROUND OF THE INVENTION

EP 2 692 153 A1, which corresponds to US Patent Application Publication No. 2019-0281393, which is hereby incorporated herein in its entirety for all purposes, discloses a MEMS sound transducer including a substrate and a plurality of at least three adjacent tapered transducer beams. Each beam has alternating piezoelectric layers and electrode layers, the piezoelectric layers being configured to convert an applied pressure into a voltage. Each beam includes a beam base, a beam tip and a beam body arranged between the beam base and the beam tip, each beam being tapered from the beam base to the beam tip. Each beam is connected to the substrate along the beam base and is free from the substrate along its beam body. The beams are arranged such that the beam tips of the beams each converge substantially to a single point. A disadvantage of such MEMS sound transducers is that local load peaks occur in the transducer beams or cantilever arm elements, which can lead to destruction of the cantilever arm element, namely in particular the piezoelectric transducer layer, at high powers. As a result, very tight manufacturing tolerances must be maintained in the production of the MEMS sound transducers in order to keep the load peaks at an acceptable level. The consequence is increased production scrap as well as increased production costs. Furthermore, the MEMS sound transducers known so far can only be operated at low power levels due to the local load peaks.

OBJECTS AND SUMMARY OF THE INVENTION

The problem addressed by the present invention is to eliminate the disadvantages known from the prior art, in particular to increase the performance of the MEMS sound transducers and/or to reduce the production scrap as well as the production costs.

The problem is solved by a MEMS sound transducer having one or more of the features described below.

A MEMS sound transducer for generating and/or detecting sound waves is provided. The MEMS sound transducer can be designed to generate and/or detect sound waves in the audible wavelength spectrum. In this case, the MEMS sound transducer is preferably designed as a tweeter and/or provided for an audio system. Additionally or alternatively, the MEMS sound transducer can be designed to generate and/or detect sound waves in the ultrasonic range. In this case, the MEMS sound transducer is preferably an ultrasonic sensor and/or ultrasonic transmitter. Additionally or alternatively, the MEMS sound transducer can be designed to transmit and/or receive, in particular binary, data, preferably encoded in audio information. In this case, the MEMS sound transducer is preferably an integral part of a data transmission device.

The MEMS sound transducer includes a support having at least one cavity wall at least partially delimiting a cavity of the MEMS sound transducer. Moreover, the MEMS sound transducer includes at least one cantilever arm element having a base section fixedly connected to the support and a flexible deflection section projecting beyond the cavity wall. The term "cantilever arm element" is to be understood to mean a beam-shaped element having a fixedly clamped end and a freely oscillating end. The deflection section has a base end facing the cavity wall and a free end deflectable relative to the support in the direction of a reciprocation axis of the MEMS sound transducer. It is provided that the base end of the deflection section has a curved first contour in a sound transducer top view.

The curved first contour has the effect that the loads are evenly distributed in the deflection section, namely in particular in the area of the base end. This can prevent damage to the cantilever arm element due to local load peaks. Due to the even distribution of the loads in the transverse direction of the cantilever arm element, the cantilever arm element can also absorb higher forces overall. Consequently, the performance of the MEMS sound transducer can also be increased by the curved first contour. Moreover, the curved first contour reduces structural differences between the center of the cantilever arm element and its corner regions, which in turn ensures a more stable operation of the MEMS sound transducer. Another advantage of the curved first contour is that the cantilever arm element, in particular its free end, performs a much cleaner reciprocating motion along the reciprocation axis. Advantageously, this allows the manufacturing tolerances for the MEMS sound transducer to be increased. Accordingly, for example, higher alignment errors of the cantilever arm element with respect to the support and/or with respect to other cantilever arm elements are tolerable. Due to the reduced requirements on the manufacturing accuracy, the manufacturing costs of the MEMS sound transducer can in turn be reduced.

In addition or alternatively to the above feature—that the base end of the deflection section in the sound transducer top view has the curved first contour—it is provided that the free end of the deflection section in a sound transducer top view has two corners, which are preferably spaced apart from each other in the transverse direction of the free end. Moreover, it is advantageous when the two corners of the free end are connected to each other via an end side in the transverse direction of the cantilever arm element, in particular of the free end. Advantageously, the performance of the cantilever arm element in the area of its free end can be improved as a result.

It is advantageous when the cavity wall has a curved second contour corresponding to the first contour of the deflection section, in particular in the area of the deflection section and/or adjacent to the deflection section, in the sound transducer top view. Preferably, the curved second contour of the cavity wall defines the curved shape of the first contour of the deflection section.

It is also advantageous when the first contour forms a positive shape and the second contour forms a corresponding negative shape.

It is also advantageous when the first contour is convex and the second contour is concavely curved. This ensures a very good load distribution in the deflection section of the cantilever arm element. Moreover, the volume of the cavity can be increased by a concave curvature of the second contour.

In an advantageous enhanced embodiment of the invention, it is advantageous when the curved first contour is formed as a curve, in particular with variable slope, and/or as a polygonal line. The term “curve” is to be understood as a smooth, i.e., kink-free and stepless, curved contour. The term “polygonal line” is to be understood as a contour formed by a plurality of points, which are connected to each other by straight connecting lines. The straight connecting lines have an angle to the respective adjacent connecting lines and thus follow the idealized curve of the first curved contour in a “coarser grid.” The polygonal line could also be stepped and/or designed as a discrete curve.

It is also advantageous when at least the deflection section is flexible and/or elastic across its entire length. As a result, a uniform bending of the cantilever arm element takes place across the entire length of the deflection section that is free of the support. Additionally or alternatively, it is advantageous when at least the deflection section in the sound transducer top view tapers from the base end in the direction of the free end, in particular in a trapezoidal or triangular shape.

It is also advantageous when the free end in the sound transducer top view is formed as a rectangular tip, wherein the sides of the rectangular tip are preferably straight or curved. The term “rectangular tip” is to be understood to mean a tip of the free end that has a rectangular shape. The two corners and the end side of the free end form a free side of this rectangle. Advantageously, a free end with two corners can be formed in a structurally simple manner.

It is advantageous when the cantilever arm element has a multi-layer design, in particular in the direction of the reciprocation axis, and includes at least one, in particular flexible, support layer and one, in particular flexible and/or piezoelectric, transducer layer. In addition, it is advantageous when the cantilever arm element has at least one electrode layer. Preferably, the at least one piezoelectric layer is sandwiched between two electrode layers in a cross-sectional view. It is advantageous when the support layer extends across the base section and the deflection section, in particular completely, in the longitudinal direction of the cantilever arm element. Additionally or alternatively, it is advantageous when the transducer layer extends across and/or into the base section and/or the deflection section, in particular only partially, in the longitudinal direction of the cantilever arm element. Additionally or alternatively, it is advantageous when the transducer layer extends from the deflection section into the base section in the longitudinal direction of the cantilever arm element. Strong reciprocation forces can be generated as a result. It is problematic, however, that this causes stresses to arise in the transducer layer in the area of the cavity wall, which can lead to a destruction of the transducer layer. These stresses can in turn be reduced by the curved first contour, however.

It is also advantageous when the transducer layer is designed as an actuator layer and/or sensor layer. As an actuator layer, the transducer layer is used to actively deflect the deflection section of the cantilever arm element due to an applied voltage. As a sensor layer, the transducer layer is used to convert a deflection of the deflection section of the cantilever arm element into an electrical voltage.

It is also advantageous when the deflection section, in particular the support layer and/or the transducer layer, has a triangular shape in the sound transducer top view. Additionally or alternatively, it is advantageous when the deflection section, in particular the support layer and/or the transducer layer in each case, has two longitudinal sides, which converge toward each other in the direction of the free end, preferably straight. Additionally or alternatively, it is advantageous when the deflection section, in particular the support layer and/or the transducer layer in each case, has a transverse side at the end facing away from the free end. Preferably, the transverse side extends in the transverse direction of the cantilever arm element and/or connects the two longitudinal sides to each other. The resulting corners between the transverse side and the respective longitudinal side can be rounded.

It is advantageous when the transducer layer is smaller, in particular smaller in terms of area, in the sound transducer top view, in particular narrower in the transverse direction and/or shorter in the longitudinal direction, than the support layer.

Moreover, it is advantageous when the longitudinal sides of the transducer layer are spaced apart from the longitudinal sides of the support layer in the sound transducer top view, wherein this spacing is preferably constant across the entire length. In this way, material of the transducer layer can be saved, whereby the manufacturing costs for the cantilever arm element can be reduced.

It is also advantageous when the at least one longitudinal side of the transducer layer is parallel to the corresponding longitudinal side of the support layer.

It is also advantageous when the first contour and/or the second contour are/is at least partially formed as a circle segment.

It is also advantageous when the first contour of the cantilever arm element and/or the second contour of the cavity wall in the sound transducer top view have/has multiple curvature sections with mutually different curvatures. In this respect, it is further advantageous when preferably the first contour of the cantilever arm element and/or the second contour of the cavity wall have/has a first curvature section with a first curvature and/or at least one second curvature section with a second curvature.

It is also advantageous when the first and/or second curvature are/is formed as a circle segment. Additionally or alternatively, it is advantageous when the first curvature has a larger radius in comparison to the second curvature.

It is advantageous when a first circle center of the first curvature in the sound transducer top view lies on a longitudinal central axis of the cantilever arm element and/or is further away from the base end than the free end. Furthermore, it is advantageous when a second circle center of the second curvature in the sound transducer top view lies on a longitudinal lateral axis of the cantilever arm element and/or between the base end and the free end.

It is also advantageous when the first curvature section is arranged between two second curvature sections in the sound transducer top view and/or in the transverse direction of the MEMS sound transducer.

It is advantageous when the MEMS sound transducer has multiple, in particular four, cantilever arm elements, which are preferably arranged relative to one another in such a way that their free ends are arranged in a center of the cavity and/or of the MEMS sound transducer in the sound transducer top view.

It is also advantageous when the two second curvature sections of two adjacent cantilever arm elements have the same second curvature so that they form a common circle segment.

It is advantageous when two adjacent cantilever arm elements are separated from each other by a separating slot, wherein the separating slot preferably extends completely through from a cantilever arm upper side to a cantilever arm lower side.

It is also advantageous when the separating slot extends from the free ends of the two cantilever arm elements in the direction of the cavity wall in the sound transducer top view. Additionally or alternatively, it is advantageous when a slot end of the separating slot facing the cavity wall is spaced apart from the cavity wall, so that the support layers of the two adjacent cantilever arm elements are connected and/or made of one piece of material in this area.

It is also advantageous when the separating slot has, at its slot end, a relief slot extending and/or curved in the transverse direction of the slot. This prevents the end of the slot from tearing.

It is also advantageous when multiple separating slots in the center of the MEMS sound transducer form an H-shaped separating slot area that separates the free ends of the cantilever arm elements from each other.

BRIEF DESCRIPTION OF THE DRAWINGS

Further advantages of the invention are described in the following exemplary embodiments, wherein.

DETAILED DESCRIPTION OF EXEMPLARY EMBODIMENTS

FIGS. 1 to 5 show various views of a MEMS sound transducer 1 in accordance with the present invention for generating and/or detecting sound waves. The MEMS sound transducer 1 desirably can be designed to generate and/or detect sound waves in the audible wavelength spectrum. In this case, the MEMS sound transducer 1 is preferably designed as a tweeter and/or provided for an audio system. Additionally or alternatively, the MEMS sound transducer 1 may be designed to generate and/or detect sound waves in the ultrasonic range. In this case, the MEMS sound transducer 1 is preferably an ultrasonic sensor and/or ultrasonic transmitter. Additionally or alternatively, the MEMS transducer 1 may be designed to transmit and/or receive data, preferably encoded in audio information. In this case, the MEMS transducer 1 is preferably an integral part of a data transmission device.

According to FIGS. 1, 2, 3 and 5, the MEMS transducer 1 includes a support 2. The support 2 may be a silicon substrate. Alternatively, the support 2 can also be a PCB circuit board. Furthermore, the MEMS sound transducer 1 includes a cavity 3, which is generally designated in FIGS. 1 and 2 and is an acoustic cavity preferably formed on a rear side of an acoustic element that can generate and/or detect sound pressure on its front side.

Figure 1:
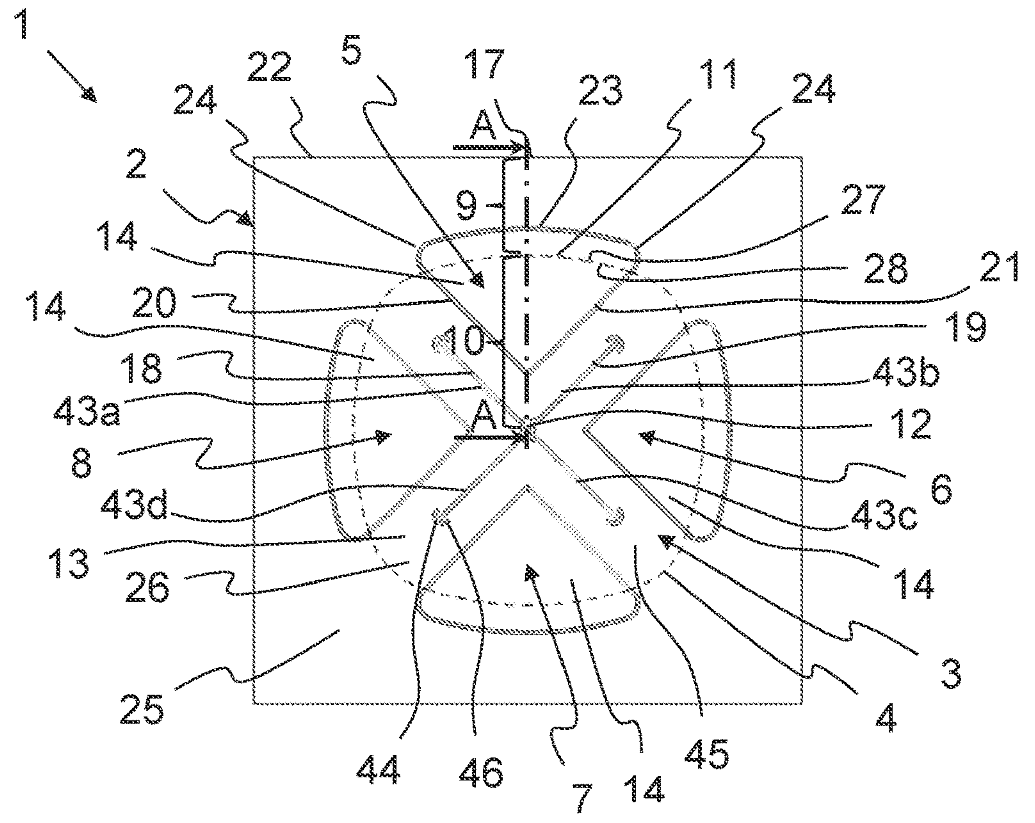
FIG. 1 shows a top view of a MEMS sound transducer with cantilever arm elements having a curved first contour.
Figure 5:
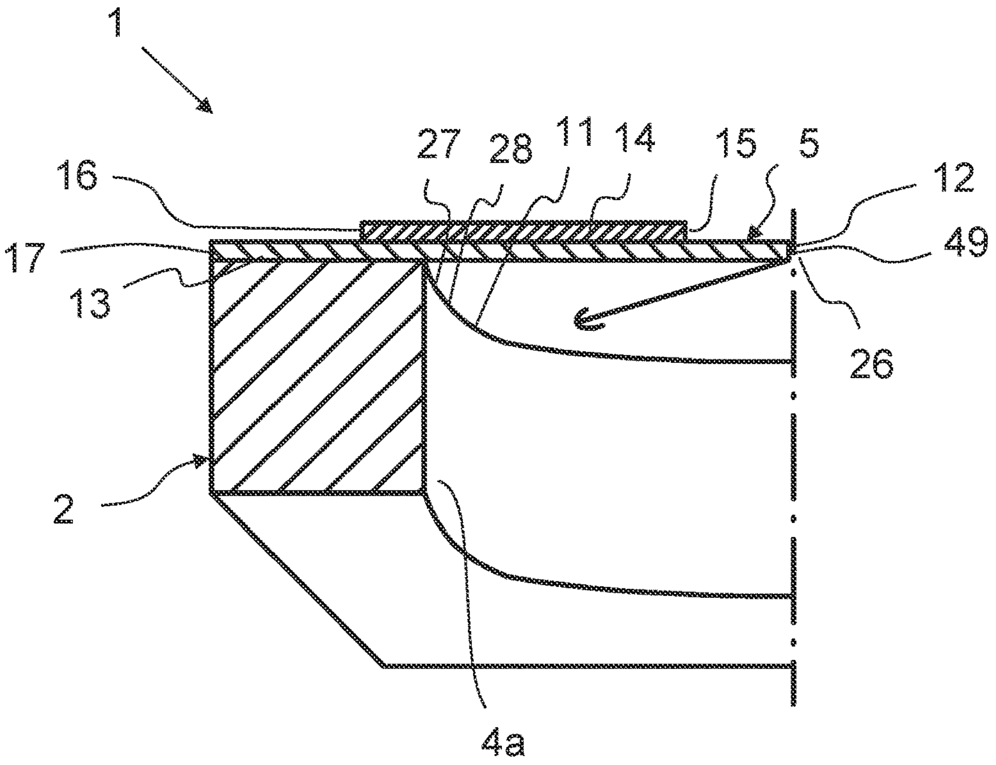
FIG. 5 shows a perspective view of a portion of the MEMS sound transducer shown in FIGS. 1, 2 and 3.

The support 2 has at least one cavity wall designated in phantom (not actually visible to the viewer of FIG. 1) by the dashed line in FIG. 1 and identified by the numeral 4, and which at least partially delimits the cavity 3. In the embodiment shown, the support 2 includes multiple, in particular four, cavity walls designated 4*a*, 4*b*, 4*c*, 4*d* in FIG. 3. As shown therein, each of two pairs of these walls has one of the paired walls arranged opposite the other one of the paired walls. The cavity walls 4*a*, 4*b*, 4*c*, 4*d* thus form a frame, which is, in particular, quadrangular and/or closed in the circumferential direction. The perspective view of FIG. 5 shows the curvature of a section of the cavity wall 4*a* for example. For generating and/or detecting the sound pressure, the MEMS sound transducer 1 includes the at least one acoustic element, which in the present case is designed as a cantilever arm element 5, 6, 7, 8.

Figure 2:
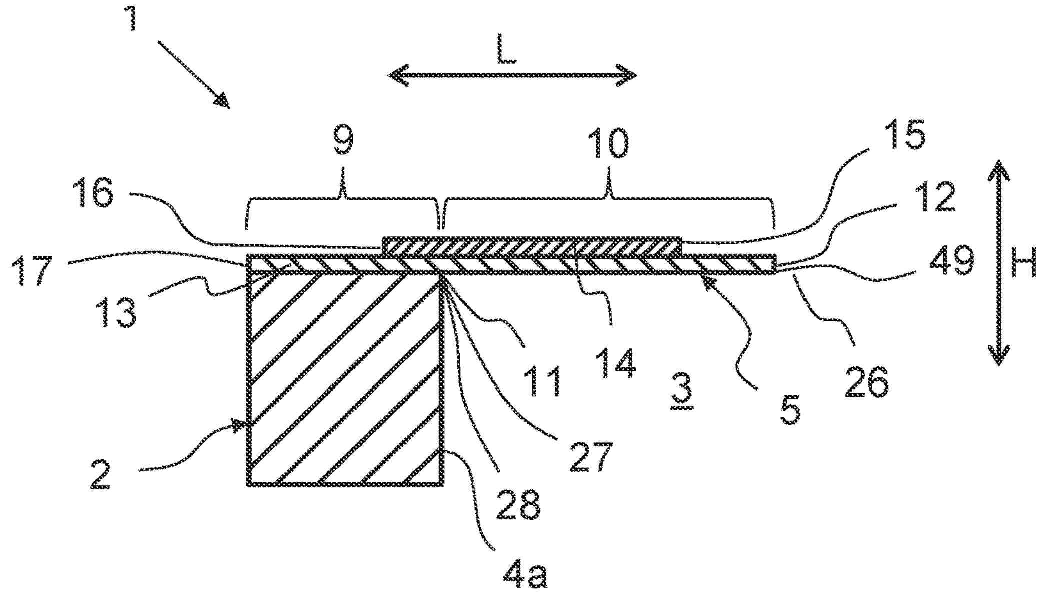
FIG. 2 shows a longitudinal section through the chain-dashed line A-A of the top plan view of the MEMS sound transducer shown in FIG. 1 in the region of one of the cantilever arm elements.

With the viewer looking in the direction of the arrows designated A-A in FIG. 1, FIG. 2 shows a longitudinal section through such a cantilever arm element 5, which includes a base section 9 and a deflection section 10 that elongates in the longitudinal direction, which is indicated by the double headed arrow designated L. Each of the other cantilever arm elements 6, 7 and 8 is configured as will be described for the exemplary cantilever arm element 5 shown in FIG. 2. In the base section 9, the cantilever arm element 5, 6, 7, 8 is firmly connected to the support 2. As a result, the cantilever arm element 5, 6, 7, 8 is fixedly clamped to the support 2 on one side, namely in its base section 9, and thus cannot move in this section relative to the support 2. In contrast, the deflection section 10 projects beyond the cavity wall 4 or overhangs the cavity wall 4. As a result, the cantilever arm element 5, 6, 7, 8 is not supported by the support 2 in its deflection section 10, so that the cantilever arm element 5, 6, 7, 8 can be bent along its length in this section in the direction of a reciprocation axis, which is indicated by the double headed arrow designated H in FIG. 2. In the longitudinal direction of the cantilever arm element 5, 6, 7, 8, the deflection section 10 includes a base end 11 facing the cavity wall 4 and a free end 12 facing away from the cavity wall 4. The base end 11 is formed to be disposed immediately adjacent to the cavity wall 4 and therefore intersects with the cavity wall 4 along a line that has a shape corresponding to the cavity wall 4. The entire deflection section 10 and in particular the free end 12 are completely stand-alone, i.e. not connected to any other element.

The deflection section 10 of the cantilever arm element 5, 6, 7, 8 is designed to be flexible, preferably over its entire length, so that the free end 12 of the deflection section 10 or of the cantilever arm element 5, 6, 7, 8 can be deflected in the direction of a reciprocation axis H by bending the deflection section 10, in particular by bending it across the entire length of the deflection section 10. This can be done either reactively due to incoming sound waves or actively to generate sound waves.

As can be seen in particular from FIG. 2, the cantilever arm element 5, 6, 7, 8 has a multi-layer design. Thus, the cantilever arm element 5, 6, 7, 8 includes multiple layers lying on top of each other in the direction of the reciprocation axis H. One of these layers is a support layer 13, which is preferably made of a flexible material, such as silicon or a polymer. In this case, the support layer 13 takes on a load-bearing function for at least one further layer. Thus, in addition to the support layer 13, the cantilever arm element 5, 6, 7, 8 further includes at least one transducer layer 14. With this transducer layer 14, sound waves can be detected and/or generated. This is done by converting kinetic energy into electricity and/or electricity into kinetic energy. In order to be able to be deflected, the transducer layer 14 is also designed to be flexible, in particular across its entire length.

The transducer layer 14 is preferably a piezoelectric layer. In order to generate sound waves, the transducer layer 14 can therefore be designed as an actuator layer, in particular a piezoelectric actuator layer. Additionally or alternatively, the transducer layer 14 can be designed as a sensor layer, in particular a piezoelectric sensor layer, for detecting sound waves. Additional layers (not shown) configured and disposed to function as electrodes can be arranged adjacent to the transducer layer 14.

According to the longitudinal section through one of the cantilever arm elements 5, 6, 7, 8 shown in FIG. 2, the support layer 13 extends across the entire length of the cantilever arm element 5, 6, 7, 8. In contrast, the transducer layer 14 is shorter than the support layer 13 in the longitudinal direction L of the cantilever arm element 5, 6, 7, 8. Thus, a first end 15 of the transducer layer 14 facing away from the cavity wall 4 is spaced apart from the free end 12 of the cantilever arm element 5, 6, 7, 8 in the longitudinal direction of the cantilever arm element 5, 6, 7, 8. An opposite second end 16 of the transducer layer 14 is spaced apart from an outer end 17 of the cantilever arm element 5, 6, 7, 8 or the support layer 13. The transducer layer 14 is located at least partially in both the base section 9 and the deflection section 10 of the cantilever arm element 5, 6, 7, 8. The portion of the transducer layer 14 located in the base section 9 of the respective cantilever arm element 5, 6, 7, 8 is thus firmly fixed to the support 2 so that it cannot be bent. The part of the transducer layer 14 located in the deflection section 10 protrudes beyond the cavity wall 4. As a result, when the deflection section 10 is deflected, the part of the transducer layer 14 located in the deflection section 10 is bent across its length, in particular its entire length, in the direction of the reciprocation axis H.

Figure 3:
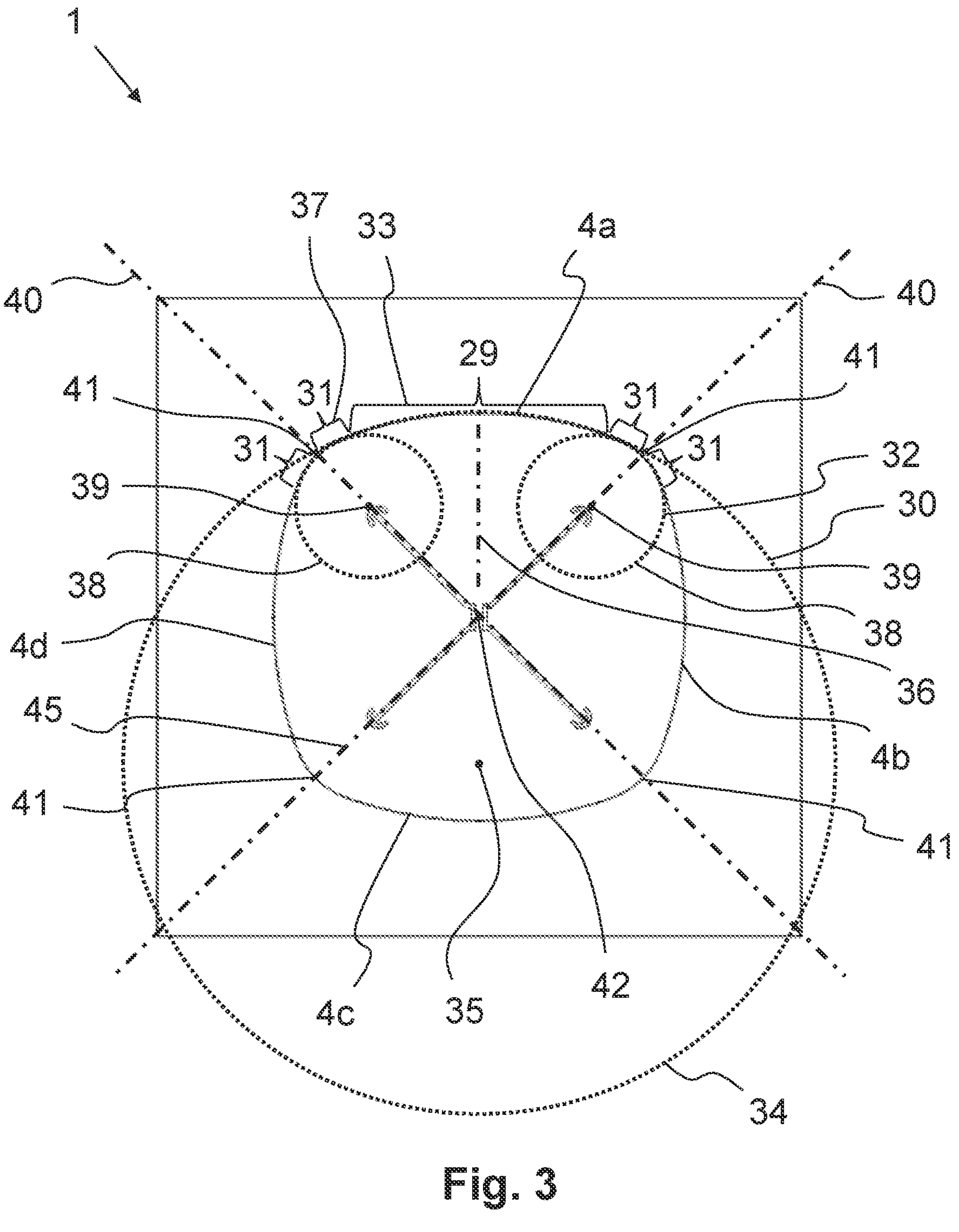
FIG. 3 shows a bottom view of the MEMS sound transducer shown in FIGS. 1 and 2 with visualized curvature geometries.

In the top view shown in FIG. 1 and the cavity-side bottom view of the MEMS sound transducer 1 shown in FIG. 3, it is apparent that the cantilever arm element 5, 6, 7, 8 tapers in the direction of the free end 12. Thus, the cantilever arm element 5, 6, 7, 8 is wider in the region of the base section 9 than in the region of the free end 12. In the present exemplary embodiment, the cantilever arm element 5, 6, 7, 8 tapers in a triangular shape. The free end 12 thus forms a tip of the cantilever arm element 5, 6, 7, 8 oscillating freely in the direction of the reciprocation axis H.

The cantilever arm element 5, 6, 7, 8 has two longitudinal sides 18, 19 shown in FIG. 1. According to FIG. 1, these two longitudinal sides 18, 19 extend toward each other in the direction of the free end 12. The two longitudinal sides 18, 19 desirably are straight. At the outer end 17, the cantilever arm element 5, 6, 7, 8 has a transverse side 22, which preferably forms the widest point of the cantilever arm element 5, 6, 7, 8. According to the top view shown in FIG. 1, the transducer layer 14 has longitudinal sides 20, 21 corresponding to the longitudinal sides 18, 19 of the cantilever arm element 5, 6, 7, 8. However, the transducer layer 14 is narrower than the support layer 13, so that the longitudinal sides 20, 21 of the transducer layer 14 are spaced apart from the longitudinal sides 18, 19 of the cantilever arm element 5, 6, 7, 8. Preferably, the longitudinal sides 20, 21 of the transducer layer 14 are formed parallel to the longitudinal sides 18, 19 of the cantilever arm element 5, 6, 7, 8. Furthermore, the transducer layer 14 also has a transverse side 23 formed at the second end 16 of the transducer layer 14 and/or forming the second end 16. The transverse side 23 of the transducer layer 14 is convexly curved away from the first end 15 according to the top view shown in FIG. 1. Furthermore, the transducer layer 14 has corners 24 between the transverse side 23 and one opposite end of the respective longitudinal side 20, 21, which corners 24 are preferably rounded.

As shown in FIGS. 1 and 3, the MEMS sound transducer 1 includes multiple cantilever arm elements 5, 6, 7, 8, which are formed as described above. Furthermore, the MEMS sound transducer 1 includes multiple cavity walls 4*a*, 4*b*, 4*c*, 4*d*, which can be seen in particular in FIG. 3. Preferably, each of these cavity walls 4*a*, 4*b*, 4*c*, 4*d* is associated with a cantilever arm element 5, 6, 7, 8. The cavity walls 4*a*, 4*b*, 4*c*, 4*d* delimit the cavity 3 laterally and/or form a frame 25, which is closed in the circumferential direction. The frame 25 is open in the direction of the reciprocation axis H at at least one end, so that a frame opening 26 is formed. The cantilever arm elements 5, 6, 7, 8 are arranged in the direction of the reciprocation axis H in the region of this frame opening 26 and/or at least partially close it.

In the present embodiment, the MEMS transducer 1 includes four cantilever arm elements 5, 6, 7, 8 and/or four cavity walls 4*a*, 4*b*, 4*c*, 4*d*. The four cavity walls 4*a*, 4*b*, 4*c*, 4*d* form a quadrangular, in particular square, frame 25. Two cantilever arm elements 5, 6, 7, 8 are arranged opposite each other. As a result, their base ends 11 are located on two opposite cavity walls 4*a*, 4*b*, 4*c*, 4*d* of the frame 25.

As shown in particular in FIGS. 1, 2 and 3, the base end 11 of the deflection section 10 of the at least one cantilever arm element 5, 6, 7, 8 has a curved first contour 27. This first contour 27 is defined by the top edge of the immediately adjacent and/or corresponding cavity wall 4*a*, 4*b*, 4*c*, 4*d*. Accordingly, the cavity wall 4*a*, 4*b*, 4*c*, 4*d* according to the sound transducer top view shown in FIGS. 1 and 3 has, in particular at least in a region adjacent to the deflection section 10 in the direction of the reciprocation axis H, a curved second contour 28 corresponding to the first contour 27 of the deflection section 10. As a result, the first contour 27 of the base end 11 forms a positive shape and the second contour 28 of the cavity wall 4*a*, 4*b*, 4*c*, 4*d* forms a corresponding negative shape. The first contour 27 of the base end 11 of the cantilever arm element 5, 6, 7, 8 is convexly curved according to FIGS. 1 and 3. The second contour 28 of the cavity wall 4*a*, 4*b*, 4*c*, 4*d* is concavely curved.

In the exemplary embodiment shown, the curved first contour 27 and the curved second contour 28 are designed as a curve, in particular as shown in FIGS. 1 and 3. This has a variable slope so that the curve is smooth or stepless. Alternatively, the curved first contour 27 and the curved second contour 28 could also be formed as a polygonal line. In this case, the curvature of the first contour 27 and the curvature of the second contour 28 would be formed from a plurality of points that are connected to each other via straight connecting sections. The polygonal line could also be stepped and/or designed as a discrete curve.

As can be seen in particular from FIG. 3, the first contour 27 and the corresponding second contour 28 are at least partially formed as part of at least one circle 34, 38 or as at least one circle segment 33, 37. In the sound transducer top view shown in FIG. 3, the first contour 27 and the corresponding second contour 28 have multiple curvature sections 29, 31 with mutually different curvatures 30, 32. Thus, the first contour 27 and/or the second contour 28 have/has a first curvature section 29, which has a first curvature 30. The first curvature 30 is formed as a first circle segment 33 of a first circle 34 having a first circle center 35. The first circle center 35 lies on a longitudinal central axis 36 of the corresponding cantilever arm element 5, 6, 7, 8. Furthermore, the first circle center 35 is further away from the base end 11 of the deflection section 10 than the free end 12 of the MEMS sound transducer 1. The first curvature section 29 extends in the transverse direction of the cantilever arm element 5, 6, 7, 8 across the entire width of the transducer layer 14.

If the cavity wall 4*a*, 4*b*, 4*c*, 4*d* is straight in the top view, local load peaks occur in the cantilever arm element 5, 6, 7, 8, which can lead to destruction of the cantilever arm element 5, 6, 7, 8, namely in particular of the transducer layer 14. Such local load peaks occur in particular in the region of the base end 11, in particular in the region of the longitudinal central axis 36 of the cantilever arm element 5, 6, 7, 8. The curved first contour 27 and/or the second contour 28 cause(s) the loads in the deflection section 10, namely in particular in the region of the base end 11, to be distributed evenly in the transverse direction of the cantilever arm element 5, 6, 7, 8. This can prevent damage to the cantilever arm element 5, 6, 7, 8 due to overloading. Due to the even distribution of the load in the transverse direction, the cantilever arm element 5, 6, 7, 8 can also absorb higher forces overall. As a result, the performance of the MEMS sound transducer 1 can therefore also be increased by the first contour 27 and/or the second contour 28. Furthermore, the curved first contour 27 and/or the second contour 28 reduce(s) structural differences between the center of the cantilever arm element 5, 6, 7, 8 and its corner regions, as the result of which the coupling of the regions of the cantilever arm element 5, 6, 7, 8 formed with the transducer layer 14 with the support 2 is improved, which in turn ensures a more stable operation of the MEMS sound transducer 1. A further advantage of the curved first contour 27 and/or second contour 28 is that the cantilever arm element 5, 6, 7, 8, in particular its free end 12, performs a much cleaner reciprocating motion along the reciprocation axis H. Advantageously, this can increase the manufacturing tolerances for the MEMS sound transducer 1, which in turn can reduce the manufacturing costs. Accordingly, for example, higher alignment errors of the cantilever arm element 5, 6, 7, 8 relative to the support 2 and/or other cantilever arm elements 5, 6, 7, 8 are tolerable due to the curved first contour 27 and/or second contour 28.

In addition to the first curvature section 29, the first contour 27 and/or the second contour 28 according to FIG. 3 include(s) at least a second curvature section 31, which has a second curvature 32. The second curvature 32 is more curved than the first curvature 30. The second curvature 32 is formed as a second circle segment 37 of a second circle 38 having a second circle center 39. The second circle center 39 lies on a longitudinal lateral axis 40 of the cantilever arm element 5, 6, 7, 8. The longitudinal lateral axis 40 is arranged between two cantilever arm elements 5, 6, 7, 8, which are adjacent to each other in the circumferential direction. The second circle center 39 is located between the base end 11 of the deflection section 10 and the free end 12 of the MEMS sound transducer 1. As a result, the second circle center 39 is located closer to the base end 11 in comparison to the first circle center 35. The second circle segment 37 thus has a smaller radius in comparison to the first circle segment 33.

As shown in FIG. 3, the first contour 27 and/or the second contour 28 include(s) two second curvature sections 31, wherein the first curvature section 29 is arranged in the transverse direction of the cantilever arm element 5, 6, 7, 8 between these two second curvature sections 31.

The second contour 28 of the corresponding cavity wall 4*a*, 4*b*, 4*c*, 4*d* is formed according to the previous description corresponding to the first contour 27. Consequently, the second contour 28 also has a first curvature section 29 and two laterally adjacent second curvature sections 31. Here, the first curvature section 29 substantially forms one of the cavity walls 4*a*, 4*b*, 4*c*, 4*d*. As mentioned above, the support 2 includes a plurality of such cavity walls 4*a*, 4*b*, 4*c*, 4*d*, namely four according to the present exemplary embodiment. A respective cavity corner 41 is formed between two circumferentially adjacent cavity walls 4*a*, 4*b*, 4*c*, 4*d*. According to the present exemplary embodiment, these cavity corners 41 of the support 2 are rounded. As a result, two adjacent first curvature sections 29 merge smoothly into one another through the rounded cavity corner 41. The rounding of the respective cavity corner 41 is formed by the associated second curvature section 31. As a result, the rounding of the cavity corners 41 in the top view corresponds to the second curvature 32. According to FIG. 3, the cavity walls 4*a*, 4*b*, 4*c*, 4*d* of the support 2 are thus curved, in particular concave, in the top view. Furthermore, the cavity corners 41 formed between two adjacent cavity walls 4*a*, 4*b*, 4*c*, 4*d* are rounded.

According to FIGS. 1 and 3, the cantilever arm elements 5, 6, 7, 8 extend from the cavity walls 4*a*, 4*b*, 4*c*, 4*d* of the support 2 in the direction of a center 42 of the MEMS sound transducer 1. The free ends 12 of the cantilever arm elements 5, 6, 7, 8 are thus located in the region of the center 42. A separating slot 43*a*, 43*b*, 43*c*, 43*d* is formed between each two adjacent cantilever arm elements 5, 6, 7, 8, which separates the two adjacent cantilever arm elements 5, 6, 7, 8 from each other at least in one region. Here the separating slot 43*a*, 43*b*, 43*c*, 43*d* extends completely through all layers of the cantilever arm element 5, 6, 7, 8, i.e., from a cantilever arm upper side to a cantilever arm lower side. According to FIGS. 1 and 3, the respective separating slot 43*a*, 43*b*, 43*c*, 43*d* extends in the sound transducer top view from the free ends 12 of the two adjacent cantilever arm elements 5, 6, 7, 8 in the direction of the respective corresponding cavity wall 4*a*, 4*b*, 4*c*, 4*d* of the support 2. As a result, the cantilever arm elements 5, 6, 7, 8 are completely cut free and/or spaced apart in the region of their free ends 12. The separating slots 43*a*, 43*b*, 43*c*, 43*d* extend along the respective corresponding longitudinal lateral axis 40.

The separating slots 43*a*, 43*b*, 43*c*, 43*d* each have a slot end 44 facing the corresponding cavity wall 4*a*, 4*b*, 4*c*, 4*d*. The slot end 44 is spaced apart from the corresponding cavity wall 4*a*, 4*b*, 4*c*, 4*d*, in particular in the direction of the longitudinal lateral axis 40. As a result, the support layers 13 of the two adjacent cantilever arm elements 5, 6, 7, 8 are connected to each other in this slot-free region and are formed in one piece of material. Advantageously, a circumferentially closed support layer edge 45 is formed as a result in the region of the deflection sections 10 of the cantilever arm elements 5, 6, 7, 8. This improves the stability and robustness of the MEMS sound transducer 1.

To avoid tearing in the region of the slot ends 44, the separating slots 43*a*, 43*b*, 43*c*, 43*d* have relief slots 46 at their slot ends 44. These relief slots 46 extend in the transverse direction of the slot and are preferably curved.

Figure 4:
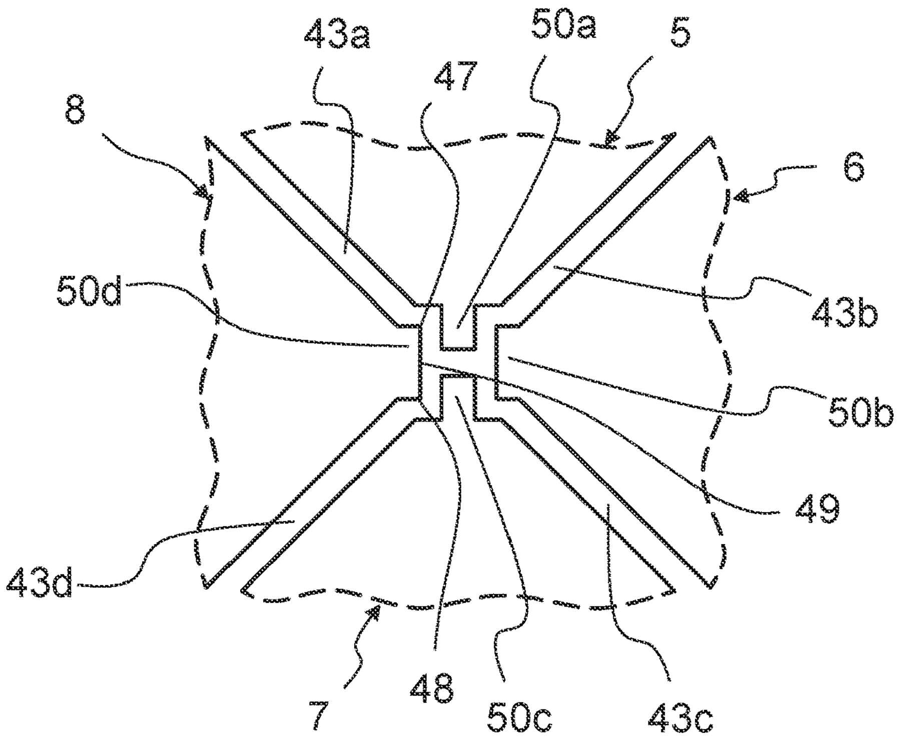
FIG. 4 shows an enlarged view of the area at a center of the MEMS sound transducer shown in FIGS. 1, 2 and 3.

FIG. 4 shows a detailed view of the center 42 of the MEMS sound transducer 1, in which it can be clearly seen that the free ends 12 of the cantilever arm elements 5, 6, 7, 8 are completely separated from each other by the separating slots 43*a*, 43*b*, 43*c*, 43*d* arranged between them. Furthermore, these are also not connected to additional components either on their upper side or on their lower side. As a result, these are completely exposed free ends 12. In order to be able to ensure the narrowest possible air gap between the cantilever arm elements 5, 6, 7, 8, in particular between their free ends 12, the free ends 12 have two corners 47, 48 in the sound transducer top view shown here. The two corners 47, 48 are connected to each other via an end side 49. The end side 49 thus forms the front side of the free end 12. Preferably, the end side 49 is straight. As can be seen from FIG. 4, the two corners 47, 48 and the end side 49 are an integral part of a rectangle, so that the free end 12 is formed as a rectangular tip 50*a*, 50*b*, 50*c*, 50*d*. In order to be able to ensure the narrowest possible air gap, the rectangular tips 50*a*, 50*c* of a first pair of rectangular tips, which includes two rectangular tips 50*a*, 50*c* of two mutually opposite cantilever arm elements 5, 7, are narrower than the rectangular tips 50*b*, 50*d* of a second pair of rectangular tips. Preferably, the first pair of rectangular tips is offset by 90° with respect to the second pair of rectangular tips in the top view or bottom view. Furthermore, the narrower rectangular tips 50*a*, 50*c* of the first pair of rectangular tips are arranged between the two end sides 49 of the rectangular tips 50*b*, 50*d* of the second pair of rectangular tips. The separating slots 43*a*, 43*b*, 43*c*, 43*d* are connected to each other in the area of the free ends 12, so that they form a common contiguous separating slot. Together with the rectangular tips 50*a*, 50*b*, 50*c*, 50*d*, the separating slots 43*a*, 43*b*, 43*c*, 43*d* thus form an H-shaped separating slot area in the center 42.

The present invention is not limited to the embodiments shown and described. Variations within the scope of the patent claims are possible, as is a combination of the features, even if these are shown and described in different exemplary embodiments.

LIST OF REFERENCE NUMERALS

1 MEMS sound transducer
2 support
3 cavity
4 cavity wall
5 first cantilever arm element
6 second cantilever arm element
7 third cantilever arm element
8 fourth cantilever arm element
9 base portion
10 deflection section
11 base end
12 free end
13 support layer
14 transducer layer
15 first end of transducer layer
16 second end of transducer layer
17 outer end
18 first longitudinal side of the cantilever arm element
19 second longitudinal side of the cantilever arm element
20 first longitudinal side of the transducer layer
21 second longitudinal side of the transducer layer
22 transverse side of cantilever arm element
23 transverse side of the transducer layer
24 corner of the transducer layer
25 frame
26 frame opening
27 first contour
28 second contour
29 first curvature section
30 first curvature
31 second curvature section
32 second curvature
33 first circle segment
34 first circle
35 first circle center
36 longitudinal central axis
37 second circle segment
38 second circle
39 second circle center
40 longitudinal lateral axis
41 cavity corner
42 enter
43 separating slot
44 slot end
45 support layer edge
46 relief slots
47 first corner of the free end
48 second corner of the free end
49 end side
50 rectangular tip
H reciprocation axis

What is claimed is:

1. A MEMS sound transducer for generating and/or detecting sound waves, including:

a support, which has a cavity wall, which at least partially delimits a cavity of the MEMS sound transducer, and a cantilever arm element, which has a base section fixedly connected to the support and which has a flexible deflection section projecting over the cavity wall, wherein the deflection section has a base end facing the cavity wall and a free end deflectable relative to the support in the direction of a reciprocation axis of the MEMS sound transducer, wherein the base end of the deflection section and the cavity wall face each other along an interface that follows a curved contour that has multiple curvature sections with mutually different curvatures.

2. The MEMS sound transducer according to claim 1, wherein the base end has a curved first contour and wherein the cavity wall has a curved second contour corresponding to the first contour of the deflection section, wherein the first contour is convexly curved and the second contour is concavely curved.

3. The MEMS sound transducer of claim 1, wherein the cantilever arm element has a multi-layer design and includes at least one support layer and at least one piezoelectric transducer layer, wherein the support layer and the transducer layer extend across the base section and the deflection section in a longitudinal direction of the cantilever arm element.

4. The MEMS sound transducer of claim 3, wherein each of the support layer and the transducer layer has two longitudinal sides, which converge towards each other in the direction of the free end, and a transverse side.

5. The MEMS sound transducer of claim 4, wherein the longitudinal sides of the transducer layer are spaced apart from the longitudinal sides of the support layer.

6. The MEMS sound transducer of claim 1, wherein the curved contour of the interface has a first curvature section, which has a first curvature, and a second curvature section, which has a second curvature.

7. The MEMS sound transducer of claim 6, wherein each of the first curvature and the second curvature is formed as a circle segment, and the first curvature has a larger radius compared to the second curvature.

8. The MEMS sound transducer of claim 6, wherein a first circle center of the first curvature lies on a longitudinal central axis of the cantilever arm element and is further away from the base end than the free end.

9. The MEMS sound transducer of claim 6, wherein a second circle center of the second curvature lies on a longitudinal lateral axis of the cantilever arm element and between the base end and the free end.

10. The MEMS sound transducer of claim 6, wherein the first curvature section is arranged between two second curvature sections.

11. The MEMS sound transducer of claim 1, further comprising,
at least one further cantilever arm element;
wherein the first cantilever arm elements are arranged relative to one another in such a way that their respective free ends are arranged in a center of the MEMS sound transducer,
wherein each free end of each of the cantilever arm elements is formed as a rectangular tip,
and wherein multiple separating slots in the center of the MEMS sound transducer form an H-shaped separating slot region that separates the free ends of the cantilever arm elements from each other.

12. A MEMS sound transducer for generating and/or detecting sound waves, including:
a support, which has a cavity wall, which at least partially delimits a cavity of the MEMS sound transducer, and
at least two cantilever arm elements, each having a base section fixedly connected to the support and a flexible deflection section projecting over the cavity wall,
wherein the first cantilever arm elements are arranged relative to one another in such a way that their respective free ends are arranged in a center of the MEMS sound transducer,
wherein two adjacent cantilever arm elements are separated from each other by a separating slot, wherein the separating slot extends from the free ends of the two adjacent cantilever arm elements in the direction of the cavity wall and wherein a slot end of the separating slot facing the cavity wall is spaced from the cavity wall, so that the support layers of the two adjacent cantilever arm elements are connected in this region,
wherein the separating slot has at its slot end a relief slot extending in a transverse direction of the separating slot.

13. A MEMS sound transducer for generating and/or detecting sound waves,
including:
a support, which has a cavity wall, which at least partially delimits a cavity of the MEMS sound transducer, and
at least one cantilever arm element, which has a base section fixedly connected to the support and a flexible deflection section projecting over the cavity wall, wherein the deflection section has a base end facing the cavity wall and a free end deflectable relative to the support in the direction of a reciprocation axis of the MEMS sound transducer,
wherein the free end of the deflection section has two corners and a free end side in a sound transducer top view,
wherein the two corners and the free end are an integral part of a rectangle so that the free end of the deflection section is formed as a rectangular tip.

14. A MEMS sound transducer for generating and/or detecting sound waves,
including:
a support, which has a cavity wall, which at least partially delimits a cavity of the MEMS sound transducer, and
at least two cantilever arm elements, each having a base section fixedly connected to the support and which has a flexible deflection section projecting over the cavity wall,
wherein the deflection section has a base end facing the cavity wall and a free end deflectable relative to the support in the direction of a reciprocation axis of the MEMS sound transducer,
wherein the base end of the deflection section and the cavity wall face each other along an interface that follows a curved contour,
wherein the at least two cantilever arm elements are arranged relative to one another in such a way that their respective free ends are arranged in a center of the MEMS sound transducer,
wherein two adjacent cantilever arm elements are separated from each other by a separating slot, wherein the separating slot extends from the free ends of the two adjacent cantilever arm elements in the direction of the cavity wall and wherein a slot end of the separating slot facing the cavity wall is spaced from the cavity wall, so that the support layers of the two adjacent cantilever arm elements are connected in this region.

* * * * *